No. 693,901. Patented Feb. 25, 1902.
G. N. PORTMAN.
RELEASING TRAP.
(Application filed Apr. 5, 1901.)

(No Model.) 2 Sheets—Sheet 1.

WITNESSES:
INVENTOR
Gustave N. Portman
By L. M. Thurlow,
Atty.

THE NORRIS PETERS CO., PHOTO-LITHO., WASHINGTON, D. C.

No. 693,901. Patented Feb. 25, 1902.
G. N. PORTMAN.
RELEASING TRAP.
(Application filed Apr. 5, 1901.)
(No Model.) 2 Sheets—Sheet 2.
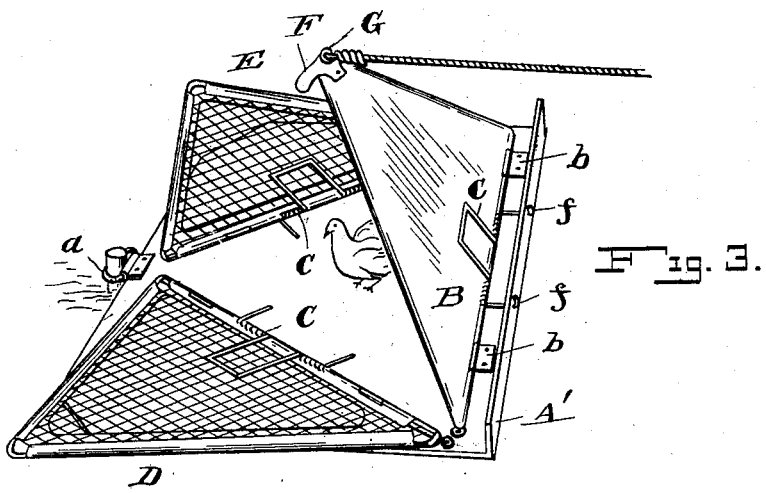
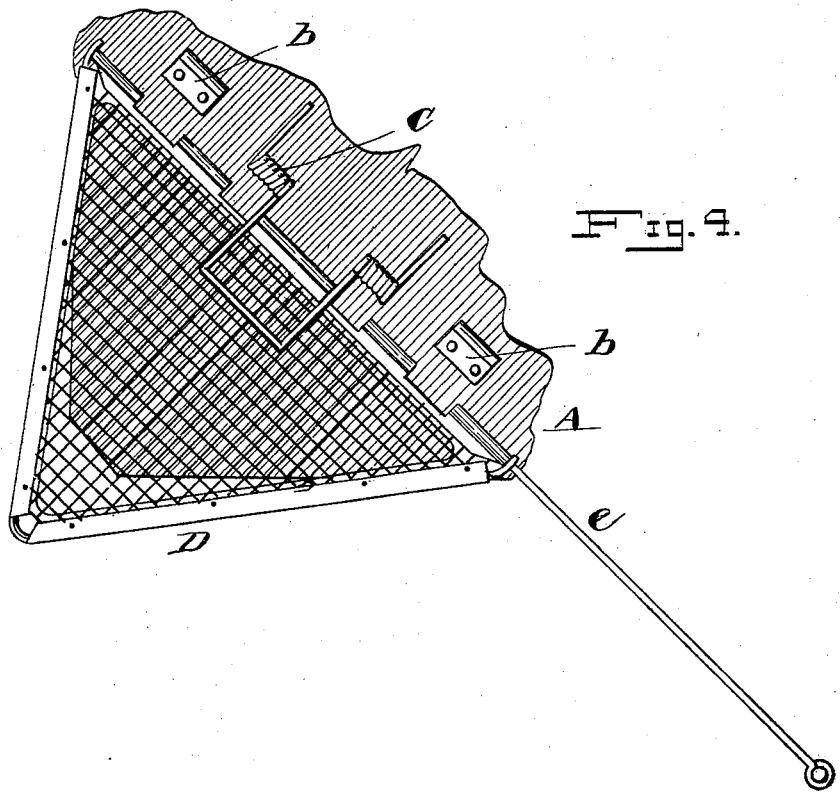
WITNESSES
INVENTOR
Gustave N. Portman
By L. M. Thurlow,
Atty.

UNITED STATES PATENT OFFICE.

GUSTAVE N. PORTMAN, OF PEORIA, ILLINOIS.

RELEASING-TRAP.

SPECIFICATION forming part of Letters Patent No. 693,901, dated February 25, 1902.

Application filed April 5, 1901. Serial No. 54,444. (No model.)

*To all whom it may concern:*

Be it known that I, GUSTAVE N. PORTMAN, a citizen of the United States, residing at Peoria, in the county of Peoria and State of Illinois, have invented certain new and useful Improvements in Releasing-Traps; and I do hereby declare that the following is a full, clear, and exact description of the invention, which will enable others skilled in the art to which it appertains to make and use the same.

This invention relates to traps for containing and releasing live birds for use in target practice.

The object of the invention is to provide a simple and cheap trap of the character described which will be easily and quickly sprung to release the bird.

A further object is to provide a trap which after being sprung can be manipulated so as to frighten or "flush" the bird in case it does not immediately take wing when the trap is opened.

Still another object is to construct a trap that can be repaired at a moment's notice in case anything about it is broken during a "shoot." This latter object is of especial importance, since if a trap is broken during such times much annoyance is caused in loss of time and disarrangement of affairs. Several traps being in use at one time with no extras at hand to replace broken ones, it will be seen that the advantage of being able to replace broken parts is a great convenience.

An important feature of my invention, as illustrated, is a protecting portion which prevents the bird in the trap being injured by stray shot which might impinge upon the bottom of the trap or other parts thereof and rebounding strike the bird and kill or maim it, so that it cannot fly when liberated.

Figure 1:
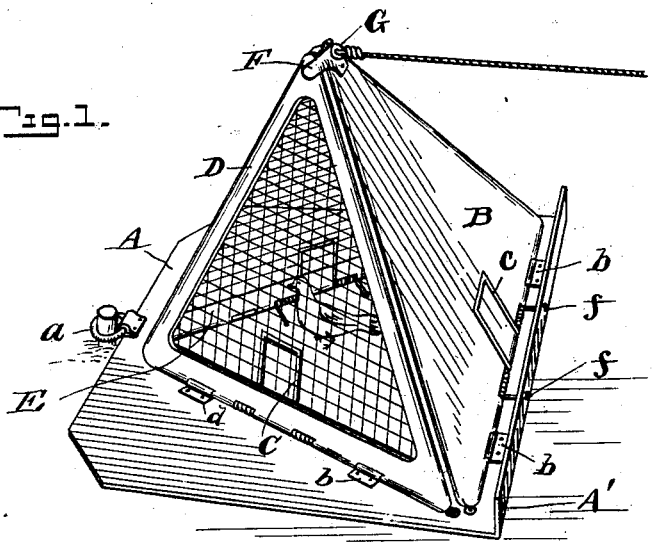
Figure 2:
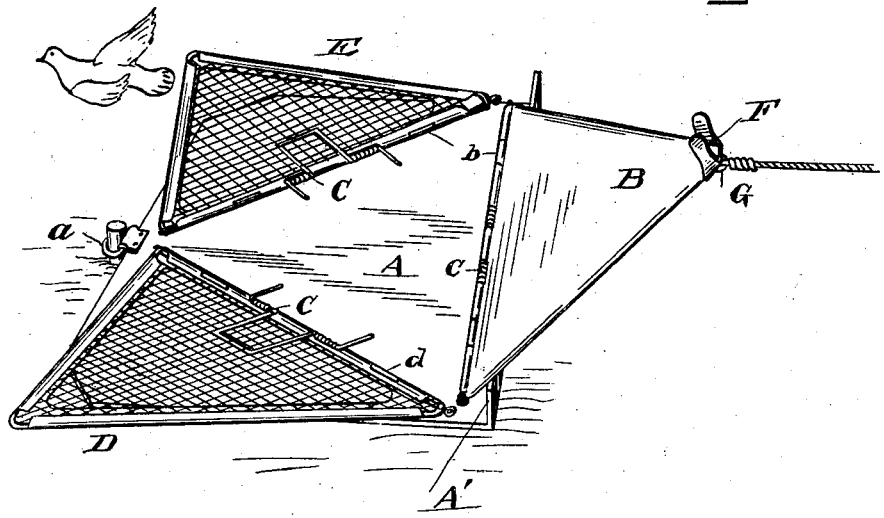

In the accompanying drawings, Figure 1 is a perspective view of my trap in position for releasing an imprisoned bird. Fig. 2 is a perspective view of the trap sprung to release the bird. Fig. 3 is also a perspective view of the trap, showing position of the back thereof utilized for flushing the bird. Fig. 4 is a plan view of a portion of the bottom of the trap, showing one of the hinged portions detached therefrom and showing the spring liberated.

In the several figures, A indicates the bottom of the trap, which is preferably made of sheet-iron. This lies upon the ground and is anchored by any good means. For this purpose I employ a ring $a$, through which a stake is driven into the ground. A triangular sheet-metal plate B is hinged to the bottom A at $b\ b$, with its base parallel with the rear edge of the said bottom, as shown, though its exact position is not material. The edges of said portion B are turned over upon a strengthening-wire, except at the bottom, which is turned over and left hollow for the entrance of a hinge-rod similar to that shown at $e$ in Fig. 4. Said rod passes through the said hollow turned edge and the hinge-sections $b\ b$ described, which are secured to the bottom by rivets or the like. The edge of the portion or back B is cut out to admit the said hinges and the coiled extremities of a spring C, which are held in place by the said hinge-rod, as will be understood. The loop of the spring rests against the outer or rear surface of the back B, and the lower extremities rest upon the bottom A and pass through an upturned lip or flange A' of the bottom, as shown at Fig. 1. The tendency of the spring is to force the back B toward the front of the trap, and the purpose of this will be understood presently.

Two wings D E, of the same general form as B, are hinged to the bottom A in the same manner as B, and the bases thereof, together with that of the latter portion, form an equilateral triangle. These portions D and E instead of being a solid sheet of metal are open except for a wire-netting, which prevents the bird escaping, but permits it to see the surrounding country, so that when liberated it is instantly ready to fly. The hinges on these wings D and E are arranged to throw the latter outwardly or away from one another. A spring-clip F is secured at the apex of the back portion B, and its projecting arms, as shown in Fig. 1, embrace the parts D and E when the device is closed. A rope or cord is attached to an eye G on the back B, and when the bird is placed in the trap, as in Fig. 1, and the rope is pulled the parts D and E are released by reason of the clip F being drawn therefrom, and when so released fall to the position shown in Fig. 2. The entire trap is flat when open, so that there is nothing to obstruct the flight of the bird.

In case the bird becomes bewildered when the trap is sprung and does not fly the operator merely slackens the rope and spring C throws the back B forward, as in Fig. 3. This movement flushes the bird and puts it to flight.

In practice it has been found that without some means of preventing the shot striking the bottom A of the trap and rebounding the bird is often hurt, so that it cannot fly, as before intimated, and in order to prevent such an occurrence I erect the flange A' and make it of sufficient height to prevent the shot entering. Obviously other means may be used for accomplishing the same end.

By my construction I am enabled to easily replace any broken parts, as before explained, and in doing this I have but to withdraw the rod $e$, Fig. 4, and this releases the spring $b\ b$. as well as the wing from the hinge-sections $b\ b$. A new spring or other part may be put in place and the rod reëntered, and the device is again ready for work.

I desire to have it understood that I do not wish to confine myself to any particular form of my trap, as it may be constructed with a larger number of the wings B D E of a different form, and the means for hinging these may be changed. Various other changes may be resorted to without departing from the spirit and intent of my invention. For instance, the said wings may be mounted on separate supports, which may be driven into the ground, and thus the bottom A may be dispensed with, if desired.

Having thus described my invention, I claim—

1. A trap of the character described consisting of wings hinged to a support and arranged in such a position that when closed together will form a cage, springs on certain of the wings to open them away from one another as described, a wing hinged to said support in the region of the other, a catch thereon for holding the other wings together to form the said cage together with the wing on which said catch is carried, and a spring on the latter wing to move it toward those with which it locks for the purposes set forth and described.

2. A trap of the character described comprising a supporting-bottom, a series of wings hinged thereto, springs on certain of said wings for throwing them outward from the center, a wing hinged to said bottom in the region of the other wings and having a spring to operate it to force it against said other wings, a catch on the latter wing for locking the entire number together and means for withdrawing the wing carrying said catch away from the other wings to liberate them and permit them to fly open as set forth and described.

3. A trap of the character described comprising a bottom, a series of wings of triangular form hinged thereto, their bases forming an equilateral triangle and arranged when brought together to form a cage for the purposes described, springs on two of the wings for throwing them outward and away from each other, and each having a wire screen for the purposes set forth, the third wing also having a spring for forcing it against the first two, a catch on the apex of the latter wing for engaging and holding the said first wings against movement, said third wing adapted to swing on its hinge after liberating the others for the purposes set forth and described.

4. A trap of the character described consisting of the bottom A, wings B, D and E hinged thereto, the latter two being open and provided with a wire-netting for the purposes set forth, a spring on each of the wings as set forth and for the purposes described, a catch F on the wing B for locking all three of the wings together, means for preventing shot entering the trap from behind or beneath the wing B, a detachable hinge connection for the several wings which consists of a hinge-rod $e$, hinge-sections $b\ b$ secured to the bottom A, and a hollow turned lower edge adapted to receive the said hinge-sections $b\ b$ and the spring and all secured together by said rod $e$ substantially as set forth and for the purposes described.

In testimony whereof I affix my signature in presence of two witnesses.

GUSTAVE N. PORTMAN.

Witnesses:
 J. N. WENS,
 A. KEITHLEY.